(12) United States Patent
Xie et al.

(10) Patent No.: US 8,427,960 B2
(45) Date of Patent: Apr. 23, 2013

(54) METHOD AND DEVICE FOR ANALYZING DATA

(75) Inventors: Daxiong Xie, Shenzhen (CN); Biao Wang, Shenzhen (CN); Hua Jiang, Shenzhen (CN); Xiangbiao Yan, Shenzhen (CN)

(73) Assignee: ZTE Corporation, Shenzhen, Guangdong (CN)

(*) Notice: Subject to any disclaimer, the term of this patent is extended or adjusted under 35 U.S.C. 154(b) by 277 days.

(21) Appl. No.: 12/989,845

(22) PCT Filed: Oct. 17, 2008

(86) PCT No.: PCT/CN2008/072741
§ 371 (c)(1),
(2), (4) Date: Oct. 27, 2010

(87) PCT Pub. No.: WO2009/132497
PCT Pub. Date: Nov. 5, 2009

(65) Prior Publication Data
US 2011/0044179 A1    Feb. 24, 2011

(30) Foreign Application Priority Data

Apr. 30, 2008  (CN) .......................... 2008 1 0088710

(51) Int. Cl.
*G06F 11/00*   (2006.01)
(52) U.S. Cl.
USPC ........................................................ 370/241
(58) Field of Classification Search .................. 370/241, 370/216, 229, 312, 503; 340/500; 375/224; 379/1.01–35; 714/25, 712
See application file for complete search history.

(56) References Cited

U.S. PATENT DOCUMENTS

2003/0161289 A1   8/2003  Abrol et al.
2010/0118760 A1*  5/2010  Xie et al. ...................... 370/312

FOREIGN PATENT DOCUMENTS

| CN | 101087430 A | * 12/2007 |
| CN | 101110961 A | 1/2008 |
| CN | 101272220 A | 9/2008 |
| JP | 2005347930 A | 12/2005 |

OTHER PUBLICATIONS

International Search Report for PCT/CN2008/072741, Prepared by the Chinese Patent Office, Dated Jan. 9, 2009, 6 Pages.

* cited by examiner

*Primary Examiner* — Mark Rinehart
*Assistant Examiner* — Mang Yeung
(74) *Attorney, Agent, or Firm* — Brooks Kushman P.c.

(57) ABSTRACT

The present invention discloses a method for analyzing data, which comprises: judging whether the read of each multiplexing block in a media unit has been completed according to the total length of the media unit and the length of the multiplexing block when reading the multiplexing blocks in the media unit; the media unit is a video unit, an audio unit or a data unit. The present invention imposes the structural features of multiplexing blocks, when the receiving quality of the mobile media broadcasting terminal is well, which dispenses with judging whether the multiplexing block is the beginning multiplexing block or the ending multiplexing block according to the beginning ID code and the ending ID code, analyzing with type and data unit type field, and CRC. Therefore, the multiplexing block analyzer steps and the procedure of data process of the receiver are predigested. It performs quick analyzing.

10 Claims, 6 Drawing Sheets

METHOD AND DEVICE FOR ANALYZING DATA

CROSS-REFERENCE TO RELATED APPLICATION

This application is the U.S. national phase of PCT Appln. No. PCT/CN2008/072741 filed Oct. 17, 2008 which claims priority to Chinese Application No. 200810088710.9 filed Apr. 30, 2008, the disclosures of which are incorporated in their entirety by reference herein.

TECHNICAL FIELD

The present invention relates to the field of mobile multimedia broadcasting, and in particular, to a method and device for analyzing data.

BACKGROUND OF THE INVENTION

Mobile multimedia broadcasting is a multimedia displaying technique that arises in recent years. A user can watch TV on a handheld terminal when moving in a high speed. The terminal receives the program list via a wireless protocol, and can select channels which it is entitled to watch, thereby receiving multimedia data of selected channels, and achieving watching TV on a mobile terminal.

In the current mobile multimedia broadcasting network, various service data are transmitted in a format defined by a certain standard and technical specification, and after a receiving terminal receives data encapsulated in a certain format, it analyzes the service data according to the definition of the format and obtains the required service data.

The second section of China Mobile Multimedia Broadcasting system standards defines the structure of a multiplexing frame for mobile multimedia broadcasting, comprising a payload, and a frame header of the multiplexing frame composed of length information, multimedia parameters, etc. The multiplexing frame defines the encapsulation format of data stream, one multiplexing frame is composed of a plurality of multiplexing subframes, and the number of multiplexing subframes is contained in the header of the multiplexing frame.

Wherein, the content of one multimedia broadcasting service is encapsulated in each multiplexing subframe, its structure being shown in FIG. 1, and a multiplexing subframe comprises a multiplexing subframe header, a video segment, an audio segment and a data segment. The multiplexing subframe header comprises video/audio/data indicators for indicating whether the present multiplexing subframe includes video/audio/data segments; wherein the video segment is formed by encapsulating a video segment header and a plurality of video units, as shown in FIG. 2a; the audio segment is formed by encapsulating an audio segment header and a plurality of audio units, as shown in FIG. 2b; the data segment is formed by encapsulating a data segment header and a plurality of data units, as shown in FIG. 2c.

The video segment, audio segment and data segment are collectively referred to as media segment and the video units, audio units and data units are collectively referred to as media units herein. The media segment and media units included in the multiplexing subframe may be one or more of the above segments and units. The number of units in the present segment and length of each unit etc. are provided in the video/audio/data segment header. Wherein, each unit is composed of one or more complete multiplexing blocks.

As shown in FIG. 3, the media unit is composed of multiplexing blocks; the multiplexing block comprises a multiplexing block header and a multiplexing block payload, and the multiplexing block header is composed of start code, start tag, end tag, type, length of payload, type of data unit and Cyclic Redundancy Check (CRC). Wherein:

Start code: it is used for indicating the start of a multiplexing block and is the first part of multiplexing block header, it may occupy the first byte of the multiplexing block, having a fixed value of 0x55.

Start tag: it is used for indicating whether the current multiplexing block is the start of the video unit/audio unit/data unit. If the current multiplexing block is the first multiplexing block of the video unit/audio unit/data unit, then the tag bit is "1"; if it is not the first multiplexing block of the video unit/audio unit/data unit, then the tag bit is "0".

End tag: it is used for indicating whether the current multiplexing block is the end of the video unit/audio unit/data unit. If the current multiplexing block is the last multiplexing block of the video unit/audio unit/data unit, then the tag bit is "1"; if it is not the last multiplexing block of the video unit/audio unit/data unit, then the tag bit is "0".

Length of payload: it is used for indicating the length of the multiplexing block payload, its unit being byte.

Type: it is used for indicating the type of the multiplexing block, comprising multiplexing blocks for bearing video, multiplexing blocks for bearing audio and multiplexing blocks for bearing data. The multiplexing blocks for bearing video constitute video units, the multiplexing blocks for bearing audio constitute audio units and the multiplexing blocks for bearing data constitute data units. The values of the types of multiplexing blocks and the types of multiplexing blocks indicated thereby are as shown in the following table.

| Value of type | type of multiplexing block |
| --- | --- |
| 00 | multiplexing blocks for bearing video |
| 01 | multiplexing blocks for bearing audio |
| 10 | multiplexing blocks for bearing data |

Type of data units: it is only valid when the type of multiplexing block is "10", and is used for constituting a data unit.

Currently, the complete flow for multiplexing block analyzing is: determining the start code of the multiplexing block header; after the start code is determined, determining whether the multiplexing block is the first multiplexing block or the last multiplexing block of the video/audio/data unit according to the start tag and the end tag of the multiplexing block; determining whether the present multiplexing block belongs to video units, audio units or data units according to the type of the multiplexing block header; if it belongs to data units, then further analyzing the data unit type field; performing CRC calculation for the multiplexing block header, and judging whether the content in each field of the multiplexing block header is correct; obtaining the length of the multiplexing block payload according to the length of the payload of the multiplexing block header; after the length of the multiplexing block payload is obtained, reading the data of the multiplexing block payload according to the length of the multiplexing block payload. There is no particular requirement on the order of analyzing each field in the above analyzing flow, provided that all fields are analyzed.

In the process of transmitting service data, the broadcasting channel signals received by a mobile multimedia terminal may be different from those transmitted by a transmitting terminal of the system due to factors such as distance, barrier shielding, multipath, Doppler effect, etc., as well as interference from other radio signals, and some data may be still unrecoverable even after demodulation/error correction processing, thus causing reception of error data and generation of bit error. Therefore, the format for encapsulating service data should meet the requirements for analyzing data when the receiving quality is not good, and when the receiving quality is good, the receiving terminal will perform some meaningless and redundant steps if it analyzes totally according to the encapsulation format of the service data.

SUMMARY OF THE INVENTION

The technical problem to be solved in the present invention is to provide a method and device for analyzing data so as to simplify steps for analyzing data and to speed up analysis when the receiving quality is perfect.

In order to solve the above technical problem, the present invention provides a method for analyzing data, comprising: judging whether read of each multiplexing block in a media unit has been finished according to a total length of the media unit and a length of the multiplexing block when reading multiplexing blocks included in the media unit; wherein the media unit is a video unit, an audio unit or a data unit.

Furthermore, the type of each multiplexing block included in the media unit is obtained according to the type of the media unit.

Furthermore, when the media unit is a data unit, a value of data unit type of each multiplexing block included in the data unit is obtained according to data unit type in a segment header of a data segment where the data unit is located.

Furthermore, said judging whether read of each multiplexing block in a media unit has been finished specifically comprises: subtracting the length of the multiplexing block from the total length of the media unit, wherein the media unit has been analyzed completely if a residual value is 0; the media unit has not been analyzed completely yet and needs to be analyzed continuously if the residual value is greater than the length of a multiplexing block header of the multiplexing block; the media unit has error analysis if the residual value is smaller than or equal to the length of the multiplexing block header of the multiplexing block, ending.

Furthermore, the method further comprises: judging whether a first byte after a multiplexing block payload of the multiplexing block read the last time is a start code of the multiplexing block, if yes, a length of the multiplexing block payload of the multiplexing block read the last time is correct; otherwise, analysis has an error, ending.

Furthermore, the method further comprises: reading payload data of the multiplexing block according to a payload length of the multiplexing block header and a start position of the payload data of the multiplexing block.

Furthermore, the method further comprises: analyzing the payload length to obtain the length of the multiplexing block payload, determining the start of the payload data of the multiplexing block by subtracting the length of one byte from the length of the multiplexing block header starting at the start code of the multiplexing block backwardly, and reading the payload data of the multiplexing block at the start of the multiplexing block payload according to the length of the multiplexing block payload.

Furthermore, the method further comprises: after reading a multiplexing block header of the first multiplexing block starting from a first multiplexing block of the media unit, judging whether a first byte of the multiplexing block header is the start code of the multiplexing block, if yes, executing reading of payload data of the multiplexing block; otherwise, reporting error analyzing of the media unit, ending.

Furthermore, the present invention also provides a device for analyzing data embedded a mobile terminal, comprising: a multiplexing block analyzing module for judging whether read of each multiplexing block in a media unit has been finished according to a total length of the media unit and a length of the multiplexing block.

Furthermore, the device further comprises a media segment analyzing module for analyzing a total length of each media unit in a media segment and notifying the multiplexing block analyzing module.

To sum up, according to the structure of multiplexing blocks, the present invention dispenses with judging whether the multiplexing block is the beginning multiplexing block or the ending multiplexing block according to the start tag and the end tag, analyzing with type and data unit type field, and checking CRC when the receiving quality of the mobile media broadcasting terminal is perfect, thus simplifying the steps for analyzing multiplexing blocks, reducing the flows for processing data at the receiving terminal, and achieving rapid analysis.

PREFERRED EMBODIMENTS OF THE INVENTION

Figure 1:
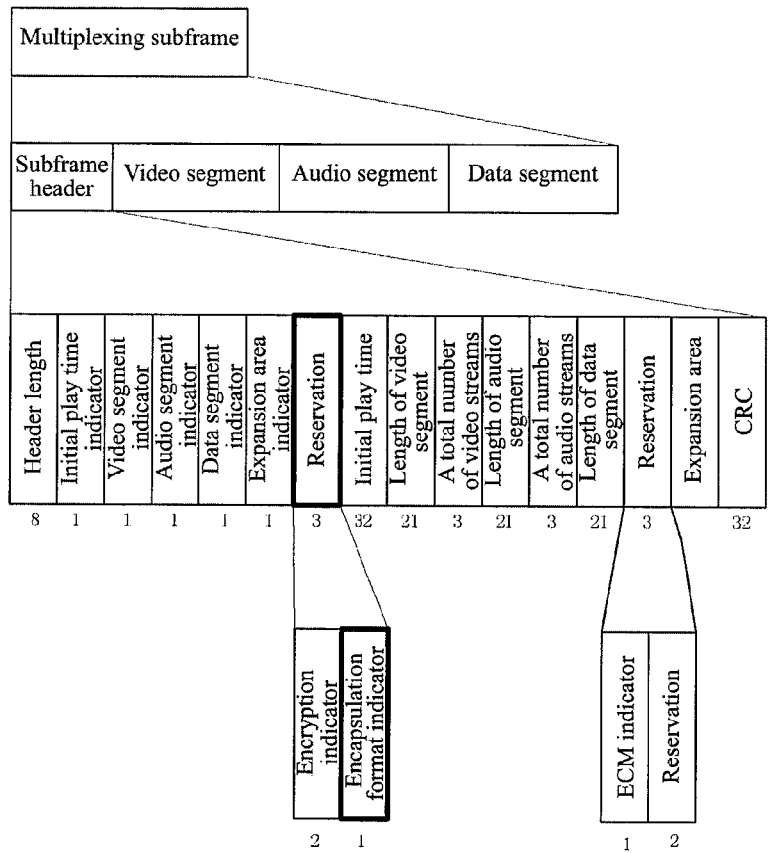
FIG. 1 illustrates the structure of a multiplexing subframe according to China Mobile Multimedia Broadcasting system standards.
Figure 2A:
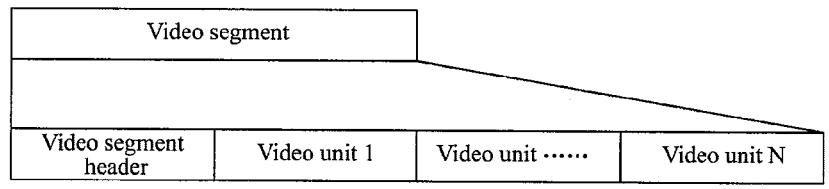
FIG. 2a illustrates the structure of a video segment in the multiplexing subframe shown in FIG. 1.
Figure 2B:
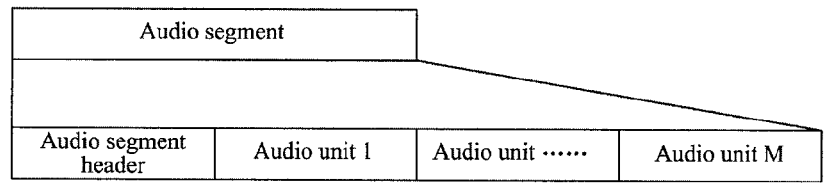
FIG. 2b illustrates the structure of an audio segment in the multiplexing subframe.
Figure 2C:
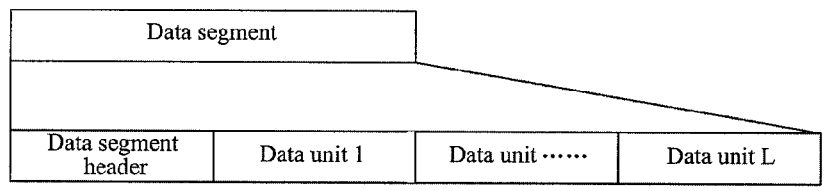
FIG. 2c illustrates the structure of a data segment in the multiplexing subframe.
Figure 3:
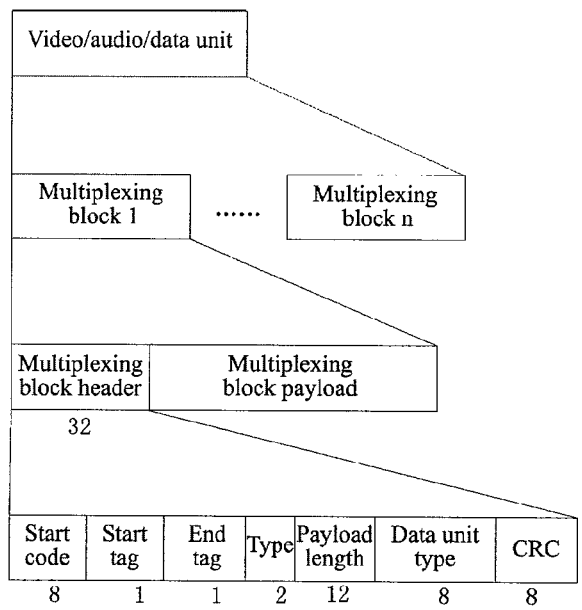
FIG. 3 illustrates the structure of a multiplexing block for constituting video units/audio units/data units in a video segment/audio segment/data segment.
Figure 4:
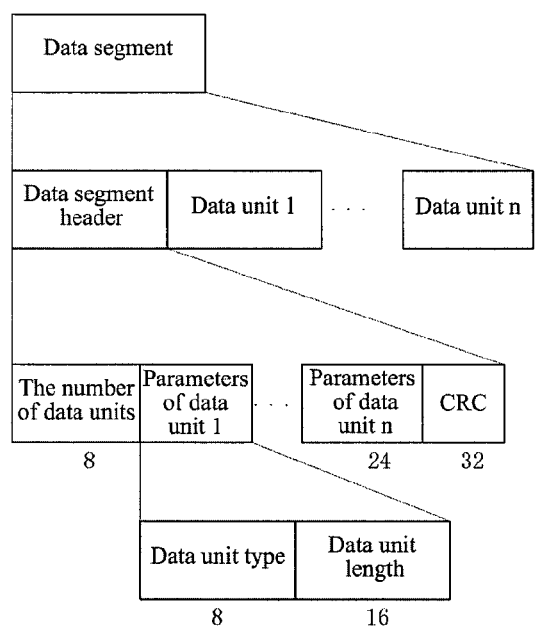
FIG. 4 illustrates the structure of a data segment and its segment header as well as data unit parameters.

Referring to FIGS. 1-3, when analyzing the media unit after correctly analyzing the multiplexing subframe header and the segment header of each media segment of the multiplexing subframe, the receiving terminal has actually acquired the type of the multiplexing block when analyzing the multiplexing block, for example, when a video unit is analyzed, its multiplexing block is obviously of a video type, and when an audio unit is analyzed, its multiplexing block is obviously of an audio type, etc.; the type of a data unit can also be obtained from the data unit type field in the data unit parameters under the data segment header, referring to FIG. 4, without analyzing the two fields of type in the multiplexing block header and the data unit type.

When a multiplexing block is correctly analyzed, the first byte after this multiplexing block is necessarily the start code of the multiplexing block if the media unit has not been analyzed completely. According to this characteristic, whether the length of the multiplexing block payload is correct or not will be known by only judging whether the first byte of the multiplexing block payload that has been read is the start code of the multiplexing block, without having to performing CRC check on the multiplexing block header.

It can be determined whether the media unit has been analyzed completely or not according to the length of the media unit and the length of the analyzed multiplexing block, without analyzing both of the start tag and end tag of each multiplexing block.

Therefore, a receiving terminal can end analyzing a multiplexing block according to the start code of the multiplexing block and the length of the multiplexing block payload, until error analyzing occurs when it starts to analyze data according to a complete process for analyzing a multiplexing block.

The method for analyzing data provided in the present invention is a simplified form of the conventional method for analyzing a media unit, wherein the payload length of a multiplexing block is analyzed after the start code of the multiplexing block is determined, and the multiplexing block payload is read according to the payload length of the multiplexing block.

Figure 5:
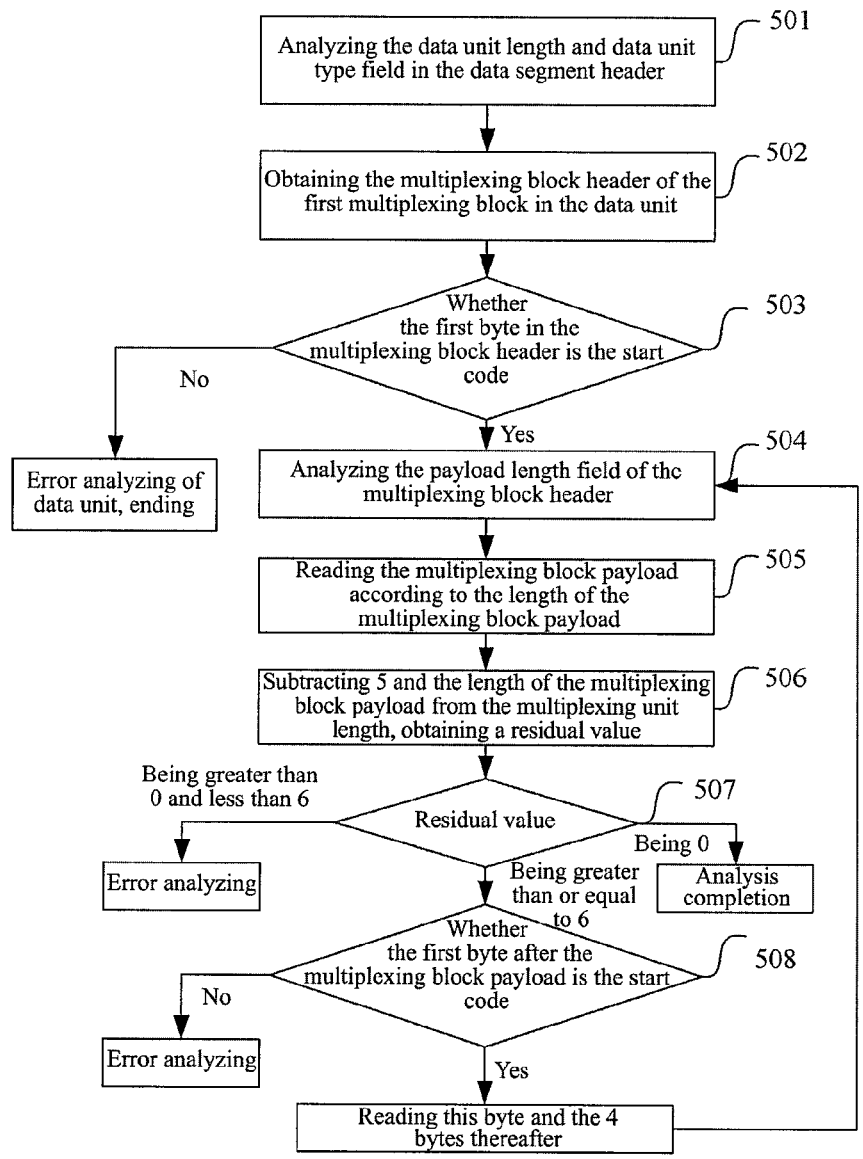
FIG. 5 is a flow according to the example of the present invention.
Figure 6:
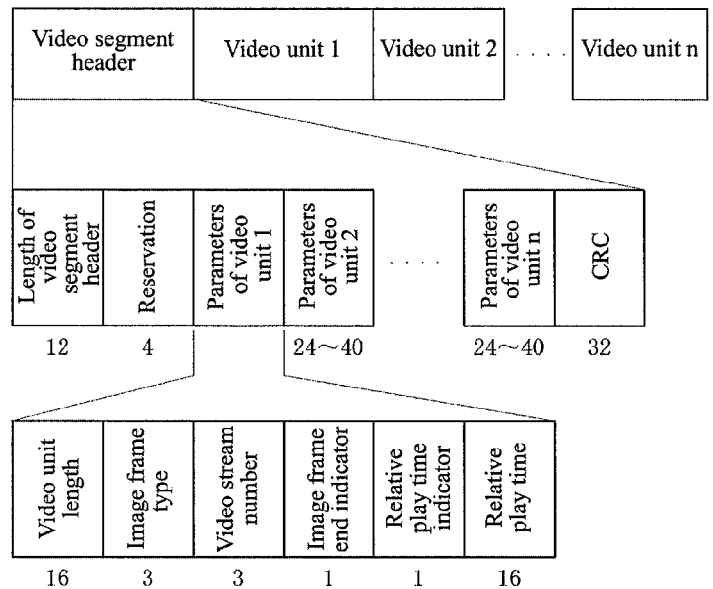
FIG. 6 illustrates the structure of a video segment and its segment header as well as video unit parameters.
Figure 7:
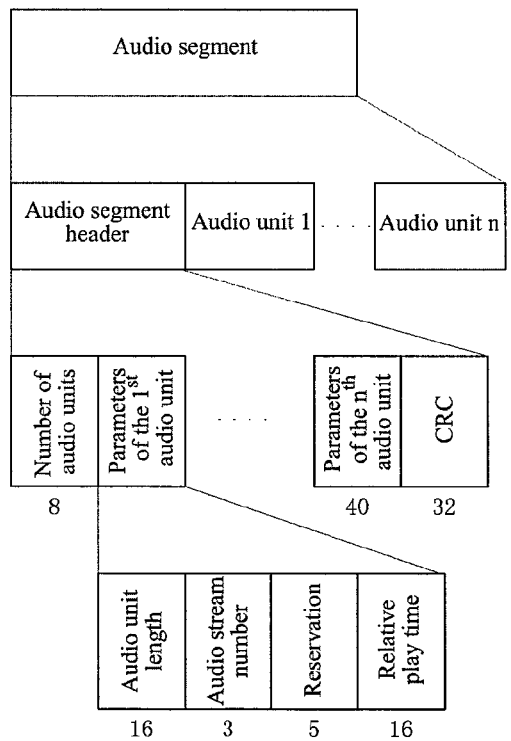
FIG. 7 illustrates the structure of an audio segment and its segment header.

The method of the present invention will be described by taking the process of a receiving terminal analyzing a data unit as an example. As shown in FIG. 5, the flow for analyzing a data unit using the method of the present invention comprises the following steps:

501: analyzing a certain multiplexing subframe, and when analyzing a data segment of the multiplexing subframe, analyzing the data unit length and data unit type field under the data unit parameters in the data segment header, analyzing the length of the data unit and the data unit type;

502: analyzing the data unit of the data segment, and obtaining the multiplexing block header of the first multiplexing block in the data unit;

wherein the first five bytes in each data unit are the multiplexing block header of the first multiplexing block, and the multiplexing block header of the first multiplexing block of the data unit can be obtained by obtaining the first five bytes of the data unit.

503: judging whether the first byte of the obtained multiplexing block header is the start code of the multiplexing block, if yes, executing step 504; otherwise, reporting error analyzing of the data unit, ending;

wherein the receiving terminal can judge whether the first byte of the multiplexing block is the start code of the multiplexing block by judging whether the first byte of the multiplexing block is 0x55.

504: analyzing the length of the current multiplexing block payload from the payload length field of the multiplexing block header;

505: reading the multiplexing block payload according to the analyzed length of the multiplexing block payload, and storing the data of the multiplexing block payload that have been read out into a buffer area;

wherein, the receiving terminal reads the payload of the current multiplexing block starting from the fifth byte after the start code of the multiplexing block, and the length of the bytes that are read out is the length of the multiplexing block payload analyzed from the payload length field.

506: subtracting 5 (the length of the multiplexing block header) from the length of the data unit analyzed from the data segment header, and then further subtracting the length of the multiplexing block payload that has been read out, and obtaining the residual value;

507: judging the residual value, wherein if the residual value is 0, it indicates that the data unit has been analyzed completely; if the residual value is greater than or equal to 6, then executing step 508; if the residual value is greater than 0 and less than 6, then reporting error analyzing of the data unit, ending;

508: judging whether the first byte after the multiplexing block payload that has been read out is the start code of the multiplexing block, if yes, then reading this byte and the 4 bytes thereafter, skipping to step 504; otherwise, reporting error analyzing of the data unit, ending.

The above is a process of analyzing a data unit according to the method of the present invention, and with regards to video and audio units, the length of their multiplexing block headers is 4 bytes since there is no data unit type field in the multiplexing block headers of video and audio units; when analyzing video and audio units:

In step 501, analyzing video/audio unit length fields under parameters of the video/audio units in video/audio segments header to analyze the length of the video/audio units.

In step 502, obtaining the multiplexing block headers of the first multiplexing blocks by acquiring the first 4 bytes in the video and audio units.

In step 505, a receiving terminal reading the payload of the current multiplexing block starting from the fourth byte after the start code of the multiplexing block.

In step 506, subtracting 4 from the length of the data unit, and further subtracting the length of the multiplexing block payload that has been read out.

In step 507, if the residual value is greater than 5, then executing step 508; if the residual value is greater than 0 and less than 5, then reporting error analyzing, ending.

In step 508, judging whether the first byte after the multiplexing block payload is the start code of the multiplexing block, if yes, then reading this byte and the 3 bytes thereafter, skipping to step 504.

In the process of analyzing a media unit, when error analyzing of the media unit occurs, the receiving terminal may execute a complete flow of analyzing a multiplexing block for the multiplexing block having error analyzing according to the structure of the multiplexing block.

Figure 8:
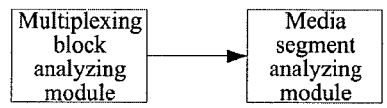
FIG. 8 is a block diagram of the device for analyzing data according to the present invention.

In addition to the method for analyzing data, the present invention also provides an analyzing device used in a mobile multimedia broadcasting receiving terminal, the structure of which is shown in FIG. 8. The device comprises a multiplexing block analyzing module and a media segment analyzing module that are connected sequentially, wherein:

the multiplexing block analyzing module judges whether read of each multiplexing block in the media unit has been finished or not according to the total length of the media unit and the length of the multiplexing block;

the media segment analyzing module is used for analyze the total length of each media unit in a media segment and notifying the multiplexing block analyzing module.

Certainly, the present invention has many other examples, and a person skilled in the art may make various corresponding modifications and transformations without departing from the spirit and essence of the present invention, but all of these corresponding modifications and transformations should fall within the protection scope of the claims appended thereto.

What we claim is:

1. A method for analyzing data, comprising:
   judging whether read of each multiplexing block in a media unit has been finished according to a total length of the media unit and a length of the multiplexing block when reading multiplexing blocks included in the media unit;
   wherein the media unit is a video unit, an audio unit or a data unit;

wherein, said judging whether read of each multiplexing block in a media unit has been finished specifically comprises: subtracting the length of the multiplexing block from the total length of the media unit, wherein the media unit has been analyzed completely if a residual value is 0; the media unit has not been analyzed completely yet and needs to be analyzed continuously if the residual value is greater than the length of a multiplexing block header of the multiplexing block; the media unit has error analysis if the residual value is smaller than or equal to the length of the multiplexing block header of the multiplexing block, ending.

2. The method according to claim 1, further comprising obtaining the type of each multiplexing block included in the media unit according to the type of the media unit.

3. The method according to claim 2, further comprising when the media unit is a data unit, obtaining a value of data unit type of each multiplexing block included in the data unit according to data unit type in a segment header of a data segment where the data unit is located.

4. The method according to claim 1, further comprising when the media unit is a data unit, obtaining a value of data unit type of each multiplexing block included in the data unit according to data unit type in a segment header of a data segment where the data unit is located.

5. The method according to claim 1, further comprising: judging whether a first byte after a multiplexing block payload of the multiplexing block read the last time is a start code of the multiplexing block, if yes, a length of the multiplexing block payload of the multiplexing block read the last time is correct; otherwise, analysis has an error, ending.

6. The method according to claim 5, further comprising: reading payload data of the multiplexing block according to a payload length of the multiplexing block header and a start position of the payload data of the multiplexing block.

7. The method according to claim 6, further comprising: analyzing the payload length to obtain the length of the multiplexing block payload, determining the start of the payload data of the multiplexing block by subtracting the length of one byte from the length of the multiplexing block header starting at the start code of the multiplexing block backwardly, and reading the payload data of the multiplexing block at the start of the multiplexing block payload according to the length of the multiplexing block payload.

8. The method according to claim 6, further comprising: after reading a multiplexing block header of the first multiplexing block starting from a first multiplexing block of the media unit, judging whether a first byte of the multiplexing block header is the start code of the multiplexing block, if yes, executing reading of payload data of the multiplexing block;

otherwise, reporting error analyzing of the media unit, ending.

9. A device for analyzing data embedded a mobile terminal, comprising a multiplexing block analyzing module for judging whether read of each multiplexing block in a media unit has been finished according to a total length of the media unit and a length of the multiplexing block;

wherein, said multiplexing block analyzing module is configured to subtract the length of the multiplexing block from the total length of the media unit, judge that the media unit has been analyzed completely if a residual value is 0, judge that the media unit has not been analyzed completely yet and needs to be analyzed continuously if the residual value is greater than the length of a multiplexing block header of the multiplexing block, and judge that the media unit has error analysis if the residual value is smaller than or equal to the length of the multiplexing block header of the multiplexing block.

10. The device according to claim 9, further comprising a media segment analyzing module for analyzing a total length of each media unit in a media segment and notifying the multiplexing block analyzing module.

* * * * *